(12) United States Patent
Hawawini et al.

(10) Patent No.: US 9,153,999 B2
(45) Date of Patent: Oct. 6, 2015

(54) CIRCUITS AND METHODS FOR AUTOMATIC POWER SOURCE DETECTION

(75) Inventors: Shadi Hawawini, San Jose, CA (US); M. Abid Hussain, Los Altos, CA (US); Georgios K. Paparrizos, Foster City, CA (US); Sridhar Kotikalapoodi, Santa Clara, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 952 days.

(21) Appl. No.: 13/280,156

(22) Filed: Oct. 24, 2011

(65) Prior Publication Data

US 2012/0217935 A1    Aug. 30, 2012

Related U.S. Application Data

(60) Provisional application No. 61/406,078, filed on Oct. 22, 2010.

(51) Int. Cl.
*H02J 7/00* (2006.01)
*H02J 7/04* (2006.01)
*H02J 7/16* (2006.01)

(52) U.S. Cl.
CPC ........... *H02J 7/04* (2013.01); *H02J 2007/0001* (2013.01)

(58) Field of Classification Search
CPC ...................................................... H02J 7/0091
USPC ................................................. 320/152, 160
See application file for complete search history.

(56) References Cited

U.S. PATENT DOCUMENTS

| | | | | |
|---|---|---|---|---|
| 7,782,022 | B2 * | 8/2010 | Xu et al. | 320/164 |
| 2008/0258688 | A1 * | 10/2008 | Hussain et al. | 320/145 |
| 2009/0115369 | A1 * | 5/2009 | Lin et al. | 320/114 |
| 2010/0270981 | A1 * | 10/2010 | Motomiya | 320/160 |

* cited by examiner

*Primary Examiner* — Edward Tso
*Assistant Examiner* — Ahmed Omar
(74) *Attorney, Agent, or Firm* — Fountainhead Law Group P.C.

(57) ABSTRACT

Embodiments of the present invention include circuits and methods for sensing resistance. In one embodiment the present invention includes a method comprising detecting a voltage at an input of a regulator received from a power adapter, determining a maximum current capability of the power adapter, and charging a battery coupled to an output of the regulator using said detected voltage and said maximum current as inputs to said regulator. In one embodiment, the detected voltage is used to configure a voltage used to determine if or when a voltage received from a power adapter drops below some threshold.

20 Claims, 4 Drawing Sheets

CIRCUITS AND METHODS FOR AUTOMATIC POWER SOURCE DETECTION

CROSS REFERENCE TO RELATED APPLICATIONS

This application claims the benefit of priority from U.S. Provisional Patent Application No. 61/406,078, filed Oct. 22, 2010, entitled "Circuits and Methods for Automatic Power Source Detection" the entire disclosure of which is hereby incorporated herein by reference.

BACKGROUND

The present invention relates to electronic circuits, and in particular, to circuits and methods for automatic power source detection.

Electronic systems require a source of power to operate. Typically, an electronic system has a connection to an external power source, such as power delivered from a power outlet in a wall plug, for example, through a power cable. External power may be used to power the electronic system and/or charge a battery in the electronic system, for example. FIG. 1 shows a typical configuration for delivering power to an electronic system and/or to charge a battery in the system. An external power source is coupled to an electronic system 103 through a power adapter 101 and regulator 102. For example, the power source may be a wall plug and power adapter 101 may be a wall adapter having a plug and circuitry for receiving an alternating current ("AC") voltage and current and outputting a direct current ("DC") voltage and current. As another example, power adapter 101 may be a personal computer coupled to the power source through a power cord. A personal computer or other electronic device may also have an internal battery that acts as the power source, for example, to another electronic device 103. A personal computer may output DC voltage and current on a port, such as a Universal Serial Bus ("USB") port, for example, which may be used to provide power to system 103 through regulator 102.

One problem with receiving power in an electronic system pertains to the specifications of voltage and current received at the input of the electronic system. Different power adapters may have drastically different voltage and current output specifications and capabilities. For example, some wall adapters may output 5 volts and a maximum of 1500 mA or higher voltages and currents. Other power adapters, such as a USB power source, may provide 5 volts and a maximum current output of 100 mA or 500 mA. Yet other wall adapters may output 12 volts and a maximum current output of 2000 mA.

Embodiments of the present invention include circuits and methods for use in an electronic system for receiving and using power from a wide variety of power adapters.

SUMMARY

Embodiments of the present invention include circuits and methods for automatic power source detection. In one embodiment the present invention includes a method comprising detecting a voltage at an input of a regulator received from a power adapter, determining a maximum current capability of the power adapter, and charging a battery coupled to an output of the regulator using said detected voltage and said maximum current as inputs to said regulator. In one embodiment, the detected voltage is used to configure a voltage (a collapse voltage) used to determine if or when a voltage received from a power adapter drops below some threshold. Accordingly, the voltage rating and current output of a power adapter may be determined and voltages and currents from the power adapter may be used to power a system or charge a battery or both, for example.

The following detailed description and accompanying drawings provide a better understanding of the nature and advantages of the present invention.

DETAILED DESCRIPTION

Described herein are techniques for circuits and methods of automatic power source detection. In the following description, for purposes of explanation, numerous examples and specific details are set forth in order to provide a thorough understanding of the present invention. It will be evident, however, to one skilled in the art that the present invention may include some or all of the features in these examples alone or in combination with other features described below, and may further include modifications and equivalents of the features and concepts described herein.

Figure 1:
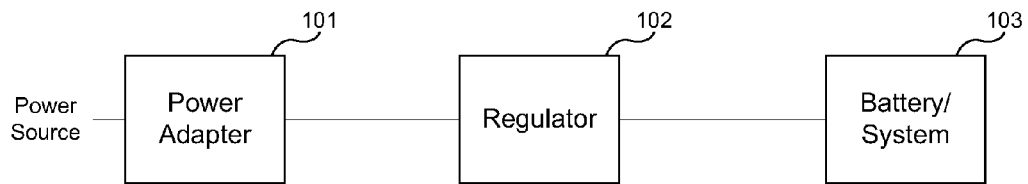
FIG. 1 shows a typical configuration for delivering power to an electronic system and/or charge a battery in the system.
Figure 2:
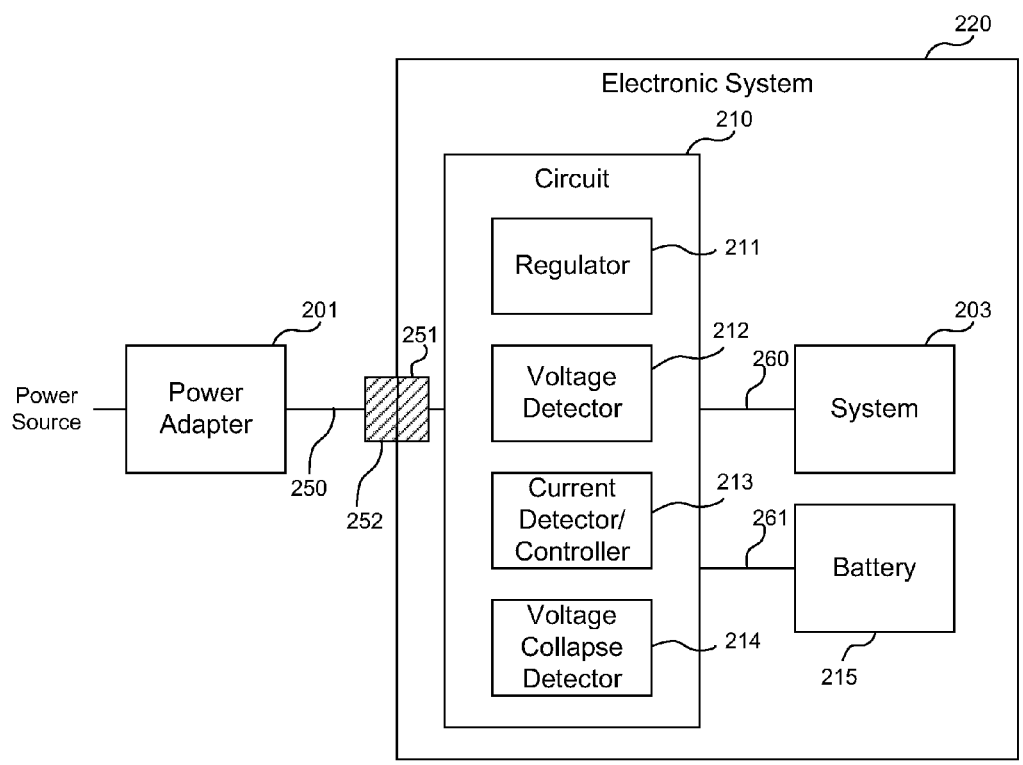
FIG. 2 illustrates an electronic system according to an embodiment of the present invention.

FIG. 2 illustrates an electronic system according to an embodiment of the present invention. FIG. 2 illustrates a power source coupled to a power adapter 201. As mentioned above, power adapter 201 may be a wall adapter for receiving AC power and outputting DC voltage and current. Power adapter 201 may be an electronic system itself (e.g., a personal computer, laptop computer, or portable electronic device) that receives AC power from a wall plug or DC power from a battery and outputs DC voltage and current according to a variety of different specifications and capabilities. Power adapter 201 may be connected to an electronic system 220, which may be a tablet computer, cellular phone, laptop computer, wireless pad, or any of a wide range of electronic devices, for example. Power adapter 201 may be connected to electronic system 220 using a cable 250 that may have one or more internal wires including at least one wire for carrying voltage and current. Cable 250 may connect with electronic system 220 using system connector 251, which provides a power input for system 220. Cable may have a cable connector 252 that mates with system connector 251, for example. In some applications, cable 250 and connectors 251 and 252 may include wires and pins for sending and receiving data (e.g., D+ and D− in USB). Cable 250 and/or either of the connectors may have a maximum current rating, for example, that specifies the maximum current that may travel through the cable without causing damage. One example cable is a USB cable that typically carries about 5 volts and a maximum of 1.8 A, for example.

One problem with some systems is that the current output capability of the power adapter and the current input capability of an electronic system may be greater than the current capability of the cable and/or connector that connects the adapter and system. It may be desirable to increase the voltage output of the power adapter 201 so that more power may be delivered to the electronic device using a cable with a lower current rating. For example, for a tablet PC, such as the iPad by Apple® Inc., the battery on the system may be very large. Accordingly, it may be desirable to transfer a large amount of power from an adapter 201 to electronic system 220 to recharge the battery in a reduced amount of time. For instance, using a typical USB connector, it may take a very long time to charge a battery on a iPad because the battery is very large and the maximum current that can be delivered is limited by the connector, for example. Accordingly, it would be desirable to allow the iPad to connect with a wide variety of different adapters through the same connector so that different adapters with higher voltage outputs may be used to increase the total power delivered to system 220 without exceeding the current capability of the connector. In one embodiment, features of the present invention allow a single system connector 251 to be used with a variety of different adapters and/or cables outputting different voltages and currents. Embodiments of the present invention may include receiving different voltage and current levels on system connector 251. System connector 251 may receive both power and data and there may be no separate power and data connectors on the system, for example. Embodiments of the present invention may include circuits that detect the voltage level received at the input of connector 251 and configure the system based on the voltage output by a particular power adapter. Embodiments of the present invention may further detect a current output capability of the particular adapter and configure the system based on the available current.

Referring again to FIG. 2, electronic system 220 includes a circuit 210 including a regulator 211, voltage detector 212, current detector/controller 213, and voltage collapse detector 214. Circuit 210 may be an integrated circuit, for example. Regulator 211 may be a linear regulator or a switching regulator, for example. Regulator 211 receives input voltage and current from power adapter 201 and generates output voltage and current. In some embodiments, regulator 211 is coupled to system 203 to provide the output voltage and current to power system 203. In some embodiments, regulator 211 is coupled to battery 215 to provide output voltage and currents to charge battery 215. In some example applications, circuit 210 is coupled to both system electronics 203 and battery 215 and provides power path circuits (not shown) interconnecting the battery and system, for example, and may include additional circuits for conditioning voltages and currents. The operation of the blocks shown for circuit 210 is described with reference to FIG. 3.

Figure 3:
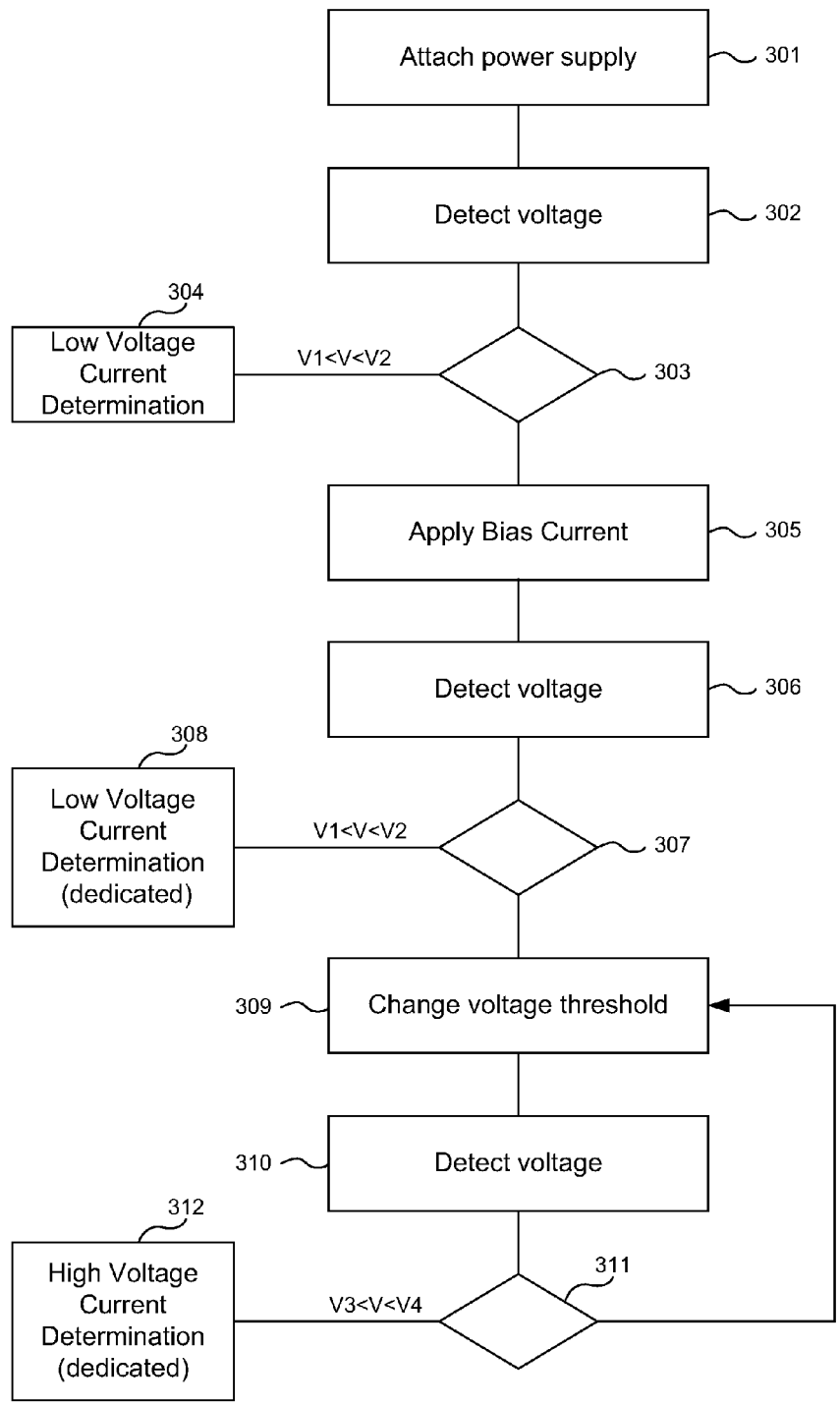
FIG. 3 illustrates method according to an embodiment of the present invention.

FIG. 3 illustrates method according to an embodiment of the present invention. At 301, a power supply may be attached to an electronic device. For example, power adapter 201 may be attached to electronic system 220 by attaching connector 251 with connector 252 to couple the power source to an input of circuit 210. At 302, a voltage received from power adapter 201 through cable 250 may be detected, for example, using voltage detector 212. Embodiments of the present invention may detect a voltage level in an input of the circuit and configure the system to operate based on the received voltage. For example, in one embodiment the circuit 210 detects the input voltage from the power adapter starting at a low voltage and increases the detection parameters until the input voltage is determined (e.g., at least to within a range). In some embodiments, voltage may be detected to within a range or window, for example. Circuit 210 may be configured to process received power differently based on the voltage detected at the input. For example, if the voltage is below a first threshold or within a first range (e.g., below 5.5 volts or between 4 and 5.5 volts) at branch point 303 then the system is configured to perform a first low voltage current determination process at 304 across a first range of current values.

In one embodiment, regulator 211 in circuit 210 is configured by current detector/controller 213 to draw current from power adapter 201. If the current drawn by regulator 211 is greater than the current output capability of power adapter 201, the voltage generated by adapter 201 will collapse (e.g., drop below a rated value). Current drawn by regulator 211 is related to current drawn by the system or battery. Current detector/controller 213 detects a current and controls regulator 211 based on the detected input current. Current detector/controller 213 may adjust regulator 211 to match a detected input current with a desired input current, for example. If the desired input current is greater than the current capability of the power adapter 201, then the voltage generated by the power adapter 201 will collapse as described above as the regulator 211 attempts to draw more current. If the voltage from adapter 201 collapses, then circuit 210 is configured by current detector/controller 213 to draw a lower current from power adapter 201. Circuit 210 may adjust the current to optimize the current drawn from power adapter 201. Current may initially start at a value below the maximum output current capability of adapter 201 and increased until the voltage from adapter 201 collapses, or current may initially start at a value above the maximum output current capability of adapter 201 and decreased until the voltage from adapter 201 does not collapse. The current determination process may further be carried out across a first range. For example, an initial current value may be set at 800 mA and reduced down to 400 mA until the adapter voltage stops collapsing for a USB 500 mA system. As another example, the initial current value may be set at 250 mA and reduced down to 50 mA until the adapter voltage stops collapsing for a USB 100 mA system. As another example, the initial current value may be set at 400 mA and increased up to as much as 2 A until the adapter voltage collapses for a USB dedicated wall charger, for example. Circuits useful for adjusting current are disclosed in U.S. Patent Publication No. 2008/0258688 A1 which is incorporated herein by reference in its entirety.

In one embodiment, voltage collapse detector 214 is configured based on the result of voltage detection at 302 by voltage detector 212. For example, if the detected voltage is below a first threshold or in a first range (e.g., 4 v<V<5.5 v), then voltage collapse detector 214 is configured to detect when the voltage from power adapter 201 drops below a threshold voltage (e.g., 4.5 v). According to this example, a threshold voltage, which may be used to determine if the power adapter voltage is collapsing under different current loads, may be set based on the result of the voltage detection step.

FIG. 3 further illustrates another feature of an embodiment of the present invention. In one embodiment, circuit 210 draws a bias current from power adapter 201. For example, a circuit (not shown) coupled to the input of circuit 210 may sink a bias current to ground or regulator 211 may be configured to draw such bias current. In some cases, a power adapter 201 may output a higher voltage when no current is being output from the adapter. When current starts to flow out of the adapter, the voltage at the output of the adapter may drop from an initial zero current voltage to a nominal voltage. Such an adapter may only require a few milli-amperes (mA) of current to reduce the output voltage from a zero current voltage to a nominal voltage. This phenomena may occur in some wall adapters, for example. Accordingly, the process illustrated in FIG. 3 may apply a bias current at 305 and detect voltage at 306. If a voltage received from power adapter 201 through cable 250 is below a threshold or in a range with the bias current turned on, for example, then the process branches at 307 and the system is configured to perform a second low voltage current determination process at 308 across a second range of current values. For example, the second range of current values may correspond to a USB dedicated wall adapter (e.g., 400 mA-2 A) because the system can infer that power is being received from a particular class of adapters (e.g., wall adapters) based on the change in voltage resulting from the bias current.

If the voltage remains above a threshold after applying the bias current at 305, the threshold is changed at 309. In one embodiment described in more detail below, a range is established by a window comparator and the range is increased from a first range to a second range if the voltage from the adapter 201 is above a threshold after applying bias current. At 310, the voltage is detected again. For example, the voltage may be compared to a new threshold or second range. If a voltage received from power adapter 201 through cable 250 is below the new threshold or in the second range, for example, then the process branches at 311 and the system is configured to perform a current determination process at a higher voltage at 312 across a range of current values. The range of current values may be the same as for a dedicated wall adapter that outputs a lower voltage, for example, performed after applying the bias current above at 308. The range may also be a different range. If the voltage from adapter 201 is above the new threshold or second range, then the process may repeat steps 309 and 310 by increasing the voltage threshold (or range) again one or more times and detecting the voltage again, for example. The above process may be used to determine the voltage on the input of circuit 210 to configure circuit 210 (e.g., collapse detector 214) to perform a current determination. It is to be understood that other techniques for setting the collapse detector 214 and current detector/controller for the current determination process may be used.

Figure 4:
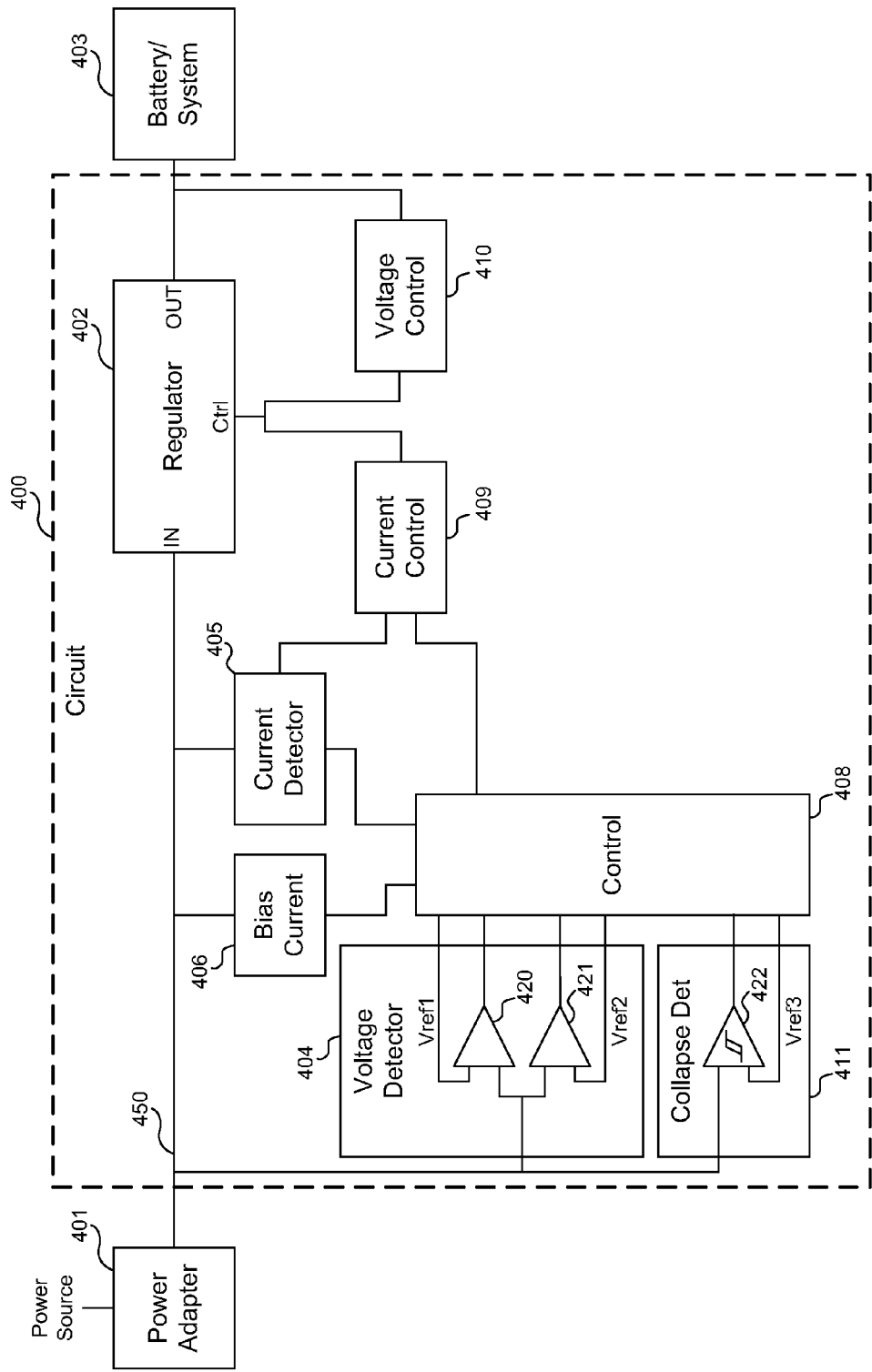
FIG. 4 illustrates an electronic circuit according to another embodiment of the present invention.

FIG. 4 illustrates an electronic circuit according to another embodiment of the present invention. In this example, an electronic circuit receives power from power adapter 401 and provides power to a system or battery, or both. In this example, a circuit according to the present invention includes regulator circuit 402, current control circuit 409, voltage control circuit 410, voltage detector circuit 404, bias current circuit 406, current detector circuit 405, collapse detector circuit 411, and control circuit 408. Some or all of the above circuits may be implemented on a single integrated circuit, for example. The operation of 400 is described with reference to the process shown in FIG. 5.

Figure 5:
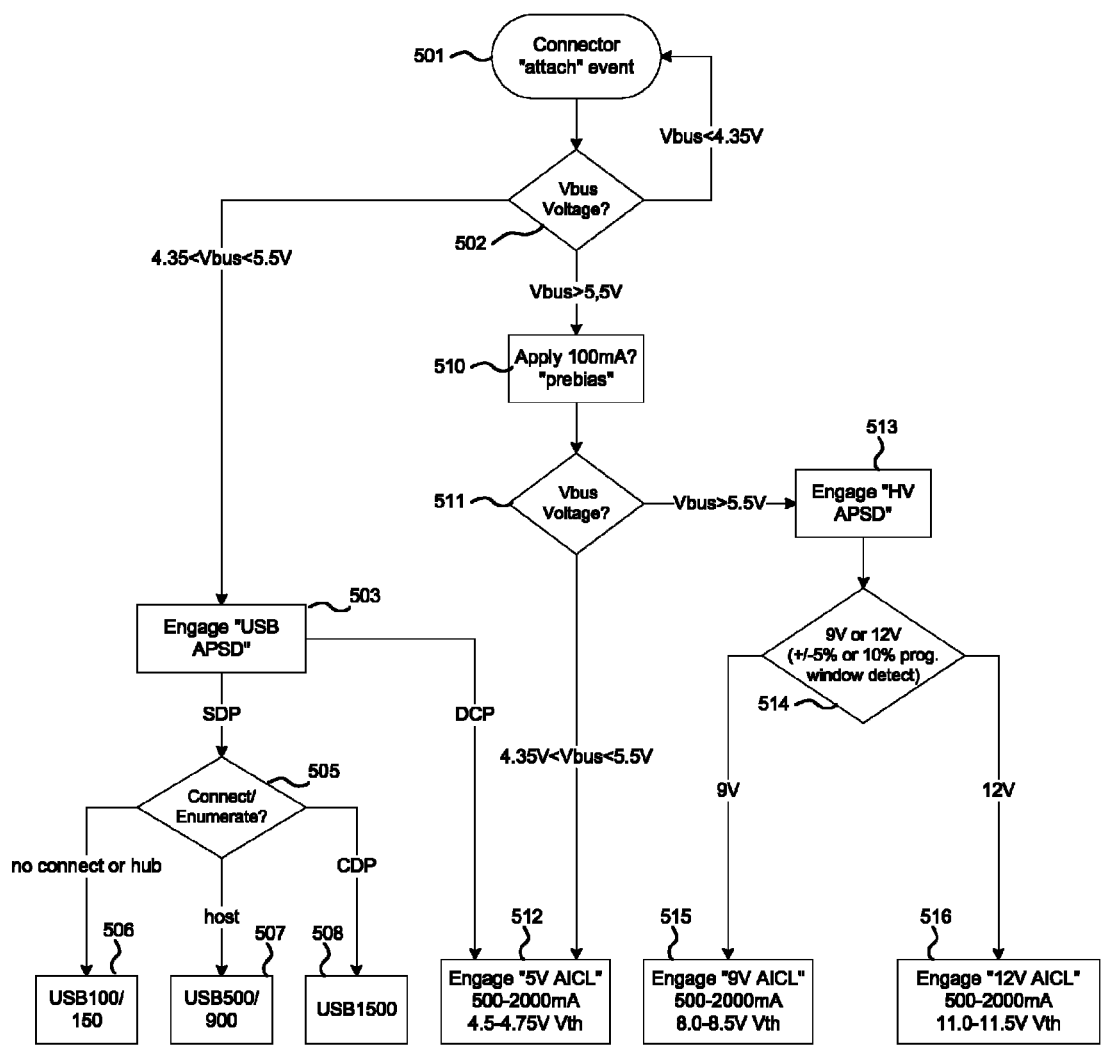
FIG. 5 illustrates an example implementation of a method according to another embodiment of the present invention.

FIG. 5 illustrates an example implementation of a method according to another embodiment of the present invention. In this example, the voltage and current specifications of an external power adapter are determined to charge a battery. For instance, at 501, a connector is attached to establish a connection between circuit 400 and power adapter 401, for example. Attaching a connector may generate a software or hardware event, for example, that starts execution of a power source detection process. At 502, the voltage on the power adapter input terminal 450 is detected. The power adapter input terminal is referred to in FIG. 5 as "Vbus." In the example circuit shown in FIG. 4, terminal 450 is coupled to an input of voltage detector 404, and voltage detector 404 includes comparators 420 and 421. Comparators 420-421 are configured as window comparators, for example. Control circuit 408 generates a first threshold voltage Vref1 and a second threshold voltage Vref2. Vref1 may be less than Vref2, for example. The voltage on terminal 450 is compared to both Vref1 and Vref2. If the voltage on terminal 450 is greater than Vref1 and less than Vref2, then output signals from comparators 420 and 421 indicate that the voltage on terminal 450 is in a first range between Vref1 and Vref2. Referring to the example in FIG. 5, Vref1 may be 4.35 v and Vref2 may be 5.5 v. If the voltage on terminal 450 is less than Vref1 (Vbus<4.35 v), then the system may return to 501 and wait for a connection event. However, if the voltage on terminal 450 is in the first range (e.g., 4.35 v<Vbus<5.5 v), then the system may perform a first current determination starting at 503. If the voltage on terminal 450 is greater than Vref2 (e.g., Vbus>5.5 v), then the system may perform process step 510 described below.

Referring to FIG. 5, steps 503-508 illustrate a USB power source detection process. For example, at 503, the system may engage a USB auto-power source detect. In one embodiment, a USB cable may include data terminals D+ and D−, a power terminal Vbus, and ground. If D+ and D− are connected together, the system may automatically transition to 512, which is a current determination process for a wall adapter (in some systems, short circuiting D+ and D− is indicated that the adapter is a wall adapter or "dedicated charging port" ("DCP")). If D+ and D− are not connected together, the process may transition to a process for determining a type of USB system that the circuit is connected to (in some systems, if D+ and D− are not short circuited, then the system is a "standard downstream port" ("SDP") such as a USB hub, USB host, or USB 1500). System 403 and/or circuit 400 may send and/or receive digital data (not shown) between to/from power adapter 401 to determine the type of USB system that is providing power at connect/enumeration step 505. If power adapter 401 is a USB hub, then the system transitions to USB 100/150 and is configured to receive a maximum current of between 100 mA to 150 mA, for example. Similarly, if power adapter 401 is a USB host, then the system transitions to USB 500/900 and is configured to receive a maximum current of between 500 mA to 900 mA, for example. If power adapter 401 is a USB 1500, then the system transitions to USB 1500 and is configured to receive a maximum current of between 1500 mA, for example. In each of these cases, circuit 400 may perform current control mode charging and voltage control mode charging cycles, for example, to charge a battery for system 403. Current control charging may be performed by current control 409 in FIG. 4 and voltage control charging may be performed by voltage control 410.

If the voltage on terminal 450 is greater than Vref2 (e.g., Vbus>5.5 v), then the system may perform process step 510. One embodiment and innovation of the present invention includes applying a pre-bias during a power source detection process. For example, control circuit 408 in FIG. 4 may activate bias current 406. Bias current 406 may draw a small amount of current from terminal 450 and power adapter 410. As mentioned above, in some cases power adapter 401 may produce a larger voltage when no current is being drawn from the output of power adapter 401. Thus, current pulled from power adapter 401 by bias circuit 406 may cause the voltage on terminal 450 to decrease. At 511, the voltage on the power adapter input terminal 450 is detected again. If the voltage on terminal 450 is now between Vref1 and Vref2 (e.g., 4.35 v<Vbus<5.5 v), the system may start a current determination process at 512 at a first voltage (e.g., 5 v) and across a first current range (e.g., 500-2000 mA).

In one embodiment, control circuit 408 may configure collapse detector 411 with a first threshold voltage Vref3 to compare against the voltage on terminal 450. For example, control circuit 408 may configure Vref3 to a voltage in the range of 4.5 v-4.75 v. Current detector 405 may detect current and generate signals to control circuit 408 or current control 409, or both, for example. Current control 409 may generate control signals to regulator 402 to set the input current to regulator 402 to a value set by control circuit 408. Control circuit 408 and current control 409 may adjust the current across a range of values to find a maximum current capability of the adapter 401 by detecting (e.g., at each current setting) if the voltage on terminal 450 decreases (collapses) at a particular current level. Control circuit 408 may include digital circuits or analog circuits, or both, for example.

Referring again to 511 in FIG. 5, if the voltage on terminal 450 is greater than Vref2 (e.g., Vbus>5.5 v), then the system may perform a high voltage auto-power source detect ("APSD") at 513. For example, if the voltage on terminal 450 is greater than Vref2, then control circuit may reconfigure Vref1 and Vref2 to define a second voltage range. Referring to FIG. 5, the process may detect Vbus=9 v by setting Vref1 to 9 v less 5% and Vref2 to 9 v plus 5% at 514. In another embodiment, a +/−10% window could also be used, for example. When the threshold voltages are set, the voltage on terminal 450 may be detected again. If the voltage on terminal 450 is in a second range (e.g., between the new values for Vref1 and Vref2), then a second current determination is performed at 515 at a second voltage. Current determination at 515 may be performed across the same range of currents as at 512 or across a different range, for example. In this example, current determination at 515 is performed across 500-2000 mA. Control circuit 408 may configure a threshold for collapse detector 422 to compare against the voltage on terminal 450 based on the result of voltage detector 404. In this case, Vref3 may be reset to a voltage between 8 v and 8.5 v, for example. If current into circuit 400 (e.g., current into regulator 402) increases above the maximum current output capability of power adapter 401, then the voltage will drop off. If the voltage drops below Vref3, the current is reduced. Current detector 405 and current control 409 may adjust the input current to regulator 402 across a range of values to determine the maximum output current of adapter 401 as describe above, for example.

Referring again to 514 in FIG. 5, if the voltage on terminal 450 is greater than Vref2 after Vref2 is increase, then control circuit 408 may reconfigure Vref1 and Vref2 to define additional voltage ranges. In this example, control circuit 408 may reconfigure Vref1 to 12 v less 5% and Vref2 to 12 v plus 5%, for example. When the threshold voltages are set, the voltage on terminal 450 may be detected again. If the voltage on terminal 450 is in the new range (e.g., between the new values for Vref1 and Vref2), then yet another current determination is performed at 516 at the new range and the voltage on terminal 450 is compared to a threshold less than the upper threshold (e.g., Vref2) of the range. In this example, the third threshold is between 11 v and 11.5 v. Current determination at 516 may be performed across the same range as current determination 512 and 515 or across a different range, for example.

While a window comparator including comparators 420-421 is illustrated in this example, it is to be understood that some embodiments may use a single comparator for determining if the voltage on terminal 450 is below a particular threshold, and then increase the threshold rather than the range to determine the voltage level on terminal 450, for example. Alternatively, the threshold may start high (e.g., 15 v) and a comparator may determine if the voltage on terminal 450 is above a particular threshold, and then decrease the threshold to determine the voltage level on terminal 450, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
detecting a voltage at an input of a regulator received from a power adapter;
configuring, based on the detected voltage, a collapse voltage;
determining a maximum current capability of the power adapter using the collapse voltage; and
charging a battery coupled to an output of the regulator using said detected voltage and said maximum current as inputs to said regulator.

2. A circuit comprising:
a regulator;
a voltage detector to detect a voltage at an input of the regulator from a power adapter;
a voltage collapse detector, wherein the voltage collapse detector is configured with a collapse voltage based on a detected voltage at the input of the regulator; and
a current control circuit, wherein the current control circuit configures the regulator to draw a plurality of currents from the power adapter to determine a maximum current capability of the power adapter using the collapse voltage,
wherein the regulator charges a battery coupled to an output of the regulator using the detected voltage and said maximum current as inputs to the regulator.

3. The method of claim 1 wherein if the detected voltage is below a first threshold, the collapse voltage is configured to a first collapse voltage level, and if the detected voltage is above the first threshold, the first threshold is increased to one or more successively increasing thresholds and said detecting is performed at each of the one or more successively increasing thresholds, and wherein when the detected voltage is below a second threshold of said one or more successively increasing thresholds, the collapse voltage is configured to a second collapse voltage level below the second threshold and above a previous threshold of said one or more successively increasing thresholds.

4. The method of claim 3 wherein said determining a maximum current capability is performed at said first collapse voltage level or said second collapse voltage level.

5. The method of claim 3 wherein the first threshold and the one or more successively increasing thresholds comprise a plurality of first reference voltage values corresponding to a plurality of ranges, wherein the ranges comprise a plurality of second reference voltage values less than corresponding first reference voltage values, and wherein said configuring is performed when the detected voltage is within a particular range.

6. The method of claim 1 further comprising applying a bias current to the power adapter.

7. The method of claim 6 wherein the bias current is applied when the detected voltage is above a first threshold, the method further comprising a second detecting the voltage at the input of the regulator received from the power adapter, wherein if the voltage at the input of the regulator received from the power adapter drops below the first threshold in response to the bias current, then the collapse voltage is configured to a first voltage level below the first threshold, and if the voltage at the input of the regulator received from the power adapter is greater than the first threshold in response to the bias current, then the first threshold is increased to one or more successively increasing thresholds.

8. The method of claim 1 wherein said voltage at the input of a regulator is received at the input of a comparator, and wherein a second input of the comparator receives a reference voltage to configure the collapse voltage.

9. The method of claim 1 wherein said voltage at the input of a regulator is received at a first input of a first comparator and a first input of a second comparator, and wherein a second input of the first comparator receives a first reference voltage to set a first threshold and wherein a second input of the second comparator receives a second voltage less than the first voltage to set a second threshold, and wherein said configuring the collapse voltage is performed when said voltage at the input of the regulator is less than the first reference voltage and greater than the second reference voltage, and wherein the collapse voltage is configured to a first collapse voltage level between the first threshold and the second threshold.

10. The circuit of claim 2 wherein if the detected voltage is below a first threshold, the collapse voltage is configured to a first collapse voltage level, and if the detected voltage is above the first threshold, the first threshold is increased to one or more successively increasing thresholds and said voltage detector detects the voltage at the input the regulator at each of the one or more successively increasing thresholds, and wherein when the detected voltage is below a second threshold of said one or more successively increasing thresholds, the collapse voltage is configured to a second collapse voltage level below the second threshold and above a previous threshold of said one or more successively increasing thresholds.

11. The circuit of claim 10 wherein said determining a maximum current capability is performed at said first collapse voltage level or said second collapse voltage level.

12. The circuit of claim 10 wherein the first threshold and the one or more successively increasing thresholds comprise a plurality of first reference voltage values corresponding to a plurality of ranges, wherein the ranges comprise a plurality of second reference voltage values less than corresponding first reference voltage values, and wherein said configuring is performed when the detected voltage is within a particular range.

13. The circuit of claim 2 further comprising a bias current circuit to apply a bias current to the power adapter.

14. The circuit of claim 13 wherein the bias current is applied when the detected voltage is above a first threshold, wherein the voltage detector detects the voltage at the input of the regulator received from the power adapter when the bias current is applied, wherein if the voltage at the input of the regulator received from the power adapter drops below the first threshold in response to the bias current, then the collapse voltage is configured to a first voltage level below the first threshold, and if the voltage at the input of the regulator received from the power adapter is greater than the first threshold in response to the bias current, then the first threshold is increased to one or more successively increasing thresholds.

15. The circuit of claim 2 wherein said voltage collapse detector comprises a comparator, wherein the voltage at the input of the regulator is received at a first input of the comparator, and wherein a second input of the comparator receives a reference voltage to configure the collapse voltage.

16. The circuit of claim 2 wherein said voltage detector comprises a first comparator and a second comparator, wherein said voltage at the input of a regulator is received at a first input of the first comparator and a first input of the second comparator, and wherein a second input of the first comparator receives a first reference voltage to set a first threshold and wherein a second input of the second comparator receives a second voltage less than the first voltage to set a second threshold, and wherein said voltage collapse detector is configured with the collapse voltage when said voltage at the input of the regulator is less than the first reference voltage and greater than the second reference voltage, and wherein the collapse voltage is configured to a first collapse voltage level between the first threshold and the second threshold.

17. A circuit comprising:
a regulator;
means for detecting a voltage at an input of the regulator from a power adapter;
means for configuring a collapse voltage based on a detected voltage at the input of the regulator; and
means for configuring the regulator to draw a plurality of currents from the power adapter to determine a maximum current capability of the power adapter using the collapse voltage,
wherein the regulator charges a battery coupled to an output of the regulator using the detected voltage and said maximum current as inputs to the regulator.

18. The circuit of claim 17 further comprising a bias current circuit to apply a bias current to the power adapter.

19. The circuit of claim 18 wherein the bias current is applied when the detected voltage is above a first threshold, wherein said means for detecting performs a second detection when the bias current is applied, wherein if the voltage at the input of the regulator received from the power adapter drops below the first threshold in response to the bias current, then the collapse voltage is configured to a first voltage level below the first threshold, and if the voltage at the input of the regulator received from the power adapter is greater than the first threshold in response to the bias current, then the first threshold is increased to one or more successively increasing thresholds.

20. The method of claim 17 wherein if the detected voltage is below a first threshold, the collapse voltage is configured to a first collapse voltage level, and if the detected voltage is above the first threshold, the first threshold is increased to one or more successively increasing thresholds and said detecting is performed at each of the one or more successively increasing thresholds, and wherein when the detected voltage is below a second threshold of said one or more successively increasing thresholds, the collapse voltage is configured to a second collapse voltage level below the second threshold and above a previous threshold of said one or more successively increasing thresholds.

* * * * *